(12) United States Patent
Fair et al.

(10) Patent No.: US 7,698,506 B1
(45) Date of Patent: Apr. 13, 2010

(54) PARTIAL TAG OFFLOADING FOR STORAGE SERVER VICTIM CACHE

(75) Inventors: Robert L. Fair, Cary, NC (US); William P. McGovern, San Jose, CA (US); Thomas C. Holland, Mountain View, CA (US); Jason Sylvain, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 521 days.

(21) Appl. No.: 11/796,337

(22) Filed: Apr. 26, 2007

(51) Int. Cl.
*G06F 13/00* (2006.01)
*G06F 13/28* (2006.01)
*G06F 12/00* (2006.01)

(52) U.S. Cl. .................. 711/133; 711/113; 711/118; 711/119; 711/120; 711/121; 711/122; 711/123; 711/124; 711/125; 711/126; 711/127; 711/128; 711/129; 711/130; 711/131; 711/132; 711/134; 711/135; 711/136; 711/137; 711/138; 711/139; 711/140; 711/141; 711/142; 711/143; 711/144; 711/145; 711/146

(58) Field of Classification Search .................. 711/113, 711/118–146
See application file for complete search history.

(56) References Cited

U.S. PATENT DOCUMENTS

| 5,113,514 | A  | * | 5/1992 | Albonesi et al. | ............ 711/144 |
| 5,548,711 | A  | * | 8/1996 | Brant et al. | .................. 714/5 |
| 5,826,052 | A  | * | 10/1998 | Stiles et al. | ................. 712/205 |
| 6,901,477 | B2 | * | 5/2005 | Sullivan | ..................... 711/113 |
| 7,424,577 | B2 | * | 9/2008 | Bali et al. | ................... 711/118 |
| 7,430,639 | B1 | * | 9/2008 | Bali et al. | ................... 711/133 |
| 2004/0153727 | A1 | * | 8/2004 | Hicken et al. | .................. 714/6 |
| 2005/0027798 | A1 | * | 2/2005 | Chiou et al. | ................ 709/203 |
| 2006/0155886 | A1 | * | 7/2006 | da Silva et al. | ................ 710/5 |

\* cited by examiner

*Primary Examiner*—Sanjiv Shah
*Assistant Examiner*—Yaima Campos
(74) *Attorney, Agent, or Firm*—Blakley, Sokoloff, Taylor & Zafman LLP

(57) ABSTRACT

A technique for partially offloading, from a main cache in a storage server, the storage of cache tags for data blocks in a victim cache of the storage server, is described. The technique includes storing, in the main cache, a first subset of the cache tag information for each of the data blocks, and storing, in a victim cache of the storage server, a second subset of the cache tag information for each of the data blocks. This technique avoids the need to store the second subset of the cache tag information in the main cache.

22 Claims, 11 Drawing Sheets

| Offset | <63:56> | <55:48> | <47:40> | <39:32> | <31:24> | <23:16> | <15:8> | <7:0> |
|---|---|---|---|---|---|---|---|---|
| 0x00 | Host Addr ||||||||
| 0x08 | Local Address ||||||||
| 0x10 | Length | Control | Status | Descr_CRC ||||
| 0x18 | Driver Storage | | | | | | Return_CRC | |
| 0x20 | Appendix[7] | Appendix[6] | Appendix[5] | Appendix[4] | Appendix[3] | Appendix[2] | Appendix[1] | Appendix[0] |
| 0x28 | Appendix[15] | Appendix[14] | Appendix[13] | Appendix[12] | Appendix[11] | Appendix[10] | Appendix[9] | Appendix[8] |
| 0x30 | Appendix[23] | Appendix[22] | Appendix[21] | Appendix[20] | Appendix[19] | Appendix[18] | Appendix[17] | Appendix[16] |
| 0x38 | Appendix[31] | Appendix[30] | Appendix[29] | Appendix[28] | Appendix[27] | Appendix[26] | Appendix[25] | Appendix[24] |

PARTIAL TAG OFFLOADING FOR STORAGE SERVER VICTIM CACHE

FIELD OF THE INVENTION

At least one embodiment of the present invention pertains to network storage systems, and more particularly, to a method and apparatus for partially offloading storage of cache tags for a storage server victim cache.

BACKGROUND

Various forms of network storage systems exist today, including network attached storage (NAS), storage area networks (SANs), and others. Network storage systems are commonly used for a variety of purposes, such as backing up critical data, data mirroring, providing multiple users with access to shared data, etc.

A network storage system includes at least one storage server, which is a processing system configured to store and retrieve data on behalf of one or more client processing systems ("clients") that are used by users of the network storage system. In the context of NAS, a storage server is commonly a file server, which is sometimes called a "filer". A filer operates on behalf of one or more clients to store and manage shared files. The files are stored in a non-volatile mass storage subsystem (which is typically external to the storage server, but does not have to be) which may include one or more arrays of non-volatile mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with access to stored data at a sub-file level of granularity, such as block-level access, rather than file-level access. Some storage servers are capable of providing clients with both file-level access and block-level access, such as certain Filers made by Network Appliance, Inc. (NetApp®) of Sunnyvale, Calif.

Caching is a technique that is commonly used to reduce latency associated with accessing data in computer-related applications, including in network storage systems. For example, the main memory (i.e., random access memory (RAM)) of a storage server is often used as a cache logically between the storage server's main central processing unit (CPU) and the non-volatile mass storage (e.g., disk) subsystem, since the RAM which forms the main memory generally has a much smaller access latency than the disk subsystem. Accordingly, the main memory of a storage server is sometimes called the "buffer cache" or, simply, the "cache". Note that this kind of cache should not be confused with other forms of cache memory, known as level-1 ("L1") cache, level-2 ("L2") cache, etc., which are commonly used by a microprocessor (and typically implemented on the same chip or the same motherboard as the microprocessor) to reduce the number of accesses to main memory. In the context of this document, the buffer cache (or simply "cache") of a storage server is the main memory of the storage server.

Some network storage servers also employ an additional level of caching logically between the buffer cache (main memory) and the non-volatile mass storage subsystem; this additional cache is known as a "victim cache". In the context of this document, a "victim cache" is a cache that holds some of the data blocks ("victims") most recently evicted from a main or primary cache, i.e., from the main memory of the storage server. The main memory in a storage server (or at least a portion of the main memory) is in certain instances called the "main cache" in this document, to distinguish it from the victim cache.

A victim cache in a storage server is generally a medium-size auxiliary storage facility that is faster than normal RAID disk storage, but slower than main memory. Such a victim cache might be implemented on, for example, an external memory card, using solid state disks (SSDs) or other types of storage devices. The size of such a cache can range from, for example, a few GBytes up to hundreds of GBytes or more. When a data block, or "buffer", is needed but not found in main memory, the victim cache is consulted prior to loading the block from RAID disks. Note that the terms "buffer" and "block" (or "data block") are used herein interchangeably in this document.

As with most caches, a victim cache of a storage server normally has a cache tag store, which contains cache tag information used to locate blocks in the victim cache and to maintain state about the blocks. The tag store is maintained in main memory, not in the victim cache itself. Each block stored in the victim cache has a corresponding cache tag stored in main memory. The cache tag of a block contains multiple fields of metadata relating to the block, including the block identifier (ID) of the block, the address of the block in the victim cache, a file identifier (ID) of the block, a file offset and various flags. For a large victim cache, the cache tag store may consume a significant portion of main memory, which is not available for other purposes, such as for use as the main cache.

SUMMARY OF THE INVENTION

The present invention includes a method which in certain embodiments includes, in a network storage server which has a non-volatile mass storage facility, a main cache and a victim cache, generating cache tag information for each of a plurality of data blocks to be stored in the victim cache, generating cache tag information for each of a plurality of data blocks to be stored in the victim cache, storing in the main cache a first subset of the cache tag information for each of the data blocks, and storing in the victim cache a second subset of the cache tag information for each of the data blocks. The invention further includes an apparatus to perform such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 8 illustrates an example of the format of a DMA descriptor;

DETAILED DESCRIPTION

A method and apparatus for partially offloading storage of cache tags for a storage server victim cache are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

In view of the considerations mentioned above, it is desirable to reduce the main memory footprint of the cache tag store used for a storage server victim cache. Accordingly, introduced here is a technique for partially offloading from main memory the storage of cache tags for a storage server victim cache. The technique includes storing, in the main cache of a storage server, a first subset of the cache tag information for each data block in the victim cache, and storing in the victim cache a second subset of the cache tag information for each data block in the victim cache. This is done without increasing the number of file system input/output operations (I/Os) (i.e., reads and writes) needed to access the victim cache. A victim cache lookup is latency sensitive, so multiple I/Os to the victim cache to satisfy a single cache read or write would be undesirable.

The technique introduced here allows additional information, such as cache tag information, to be transferred to and from the victim cache at the same time the primary data block transfer is performed, by adding a small appendix to the transfer operation. In certain embodiments, the block data plus an appendix of associated cache tag information (and/or other types of information, if desired) are efficiently read or written in a single direct memory access (DMA) transfer. The file system manager layer in the storage server is aware of the availability of the appendix functionality and uses it to offload part of the tag store into the victim cache, modifying its behavior to store and load information into the appendix as needed. Further details of this technique are described below.

By efficiently offloading parts of the victim cache tag store into the victim cache itself, the main memory footprint of the tag store is reduced, making possible the use of larger victim caches and/or improved performance because main memory is freed for other purposes.

Figure 1:
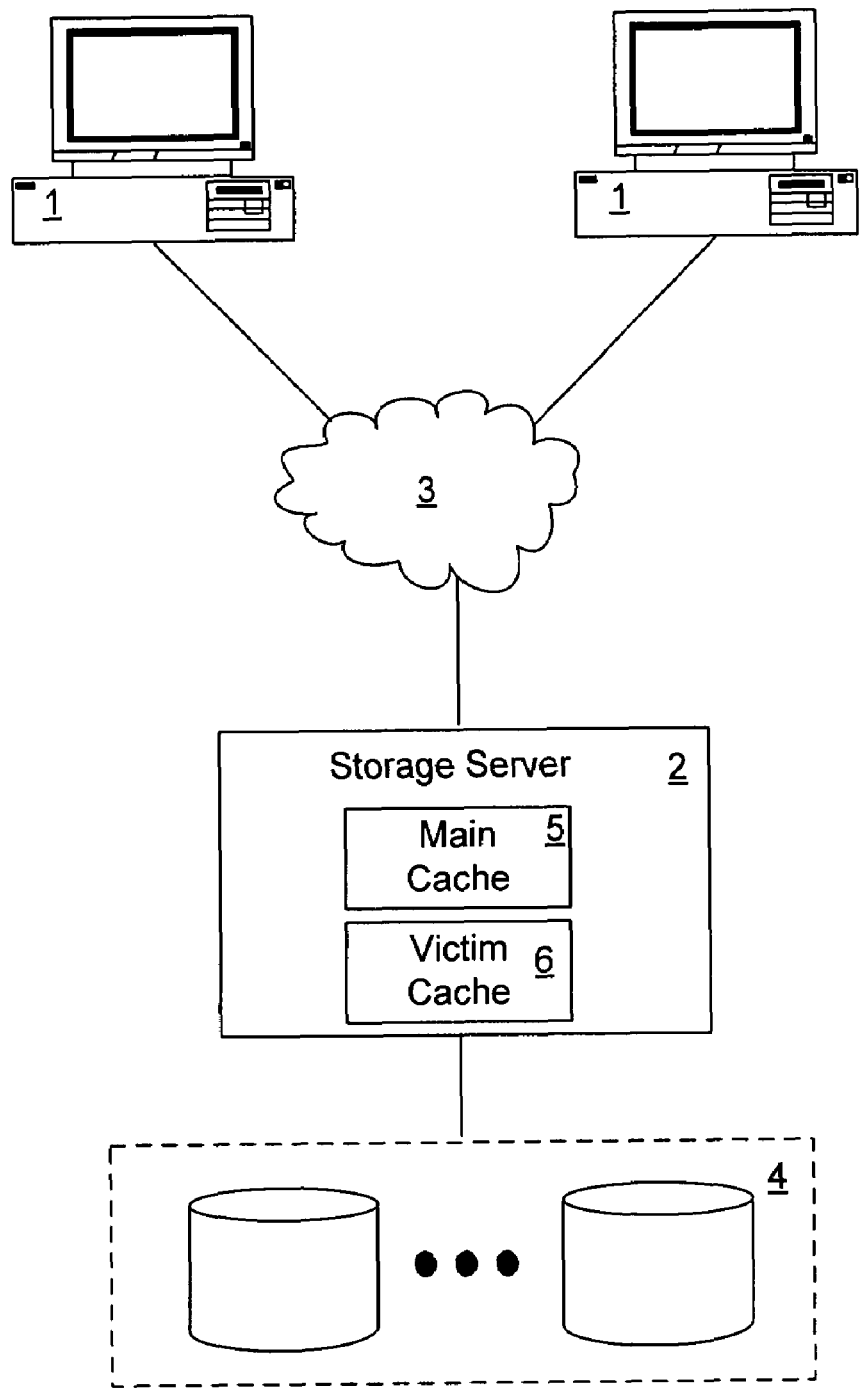
FIG. 1 illustrates a storage network environment which includes a storage server.

FIG. 1 shows a simple example of a network environment which incorporates a storage server 2, in which the technique introduced here can be implemented. As shown, the storage server 2 includes a main cache 5 and a victim cache 6. The storage server 2 is coupled to a mass storage subsystem 4, which includes a set of non-volatile mass storage devices and which is the largest data storage facility managed by the storage server 2. The storage server 2 is also coupled to a set of storage clients 1 (hereinafter simply "clients") through a network 3. The network 3 may be, for example, a local area network (LAN), a wide area network (WAN), a global area network (GAN) such as the Internet, a Fibre Channel fabric, or a combination of such networks. Each of the clients 1 may be, for example, a conventional personal computer (PC), server-class computer, workstation, or the like.

The storage subsystem 4 is managed by the storage server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in storage subsystem 4 may be organized by the storage server 2 into one or more RAID groups.

Although illustrated as a self-contained element, the storage server 2 may have a distributed architecture; for example, it may include a separate N-("network") module and D-(disk) module (not shown). In such an embodiment, the N-module is used to communicate with clients 1, while the D-module includes the file system functionality and is used to communicate with the storage subsystem 4. The N-module and D-module communicate with each other using an internal protocol. Alternatively, the storage server 2 may have an integrated architecture, where the network and data components are all contained in a single box. The storage server 2 further may be coupled through a switching fabric to other similar storage servers (not shown) which have their own local storage subsystems. In this way, all of the storage subsystems can form a single storage pool, to which any client of any of the storage servers has access.

Figure 2:
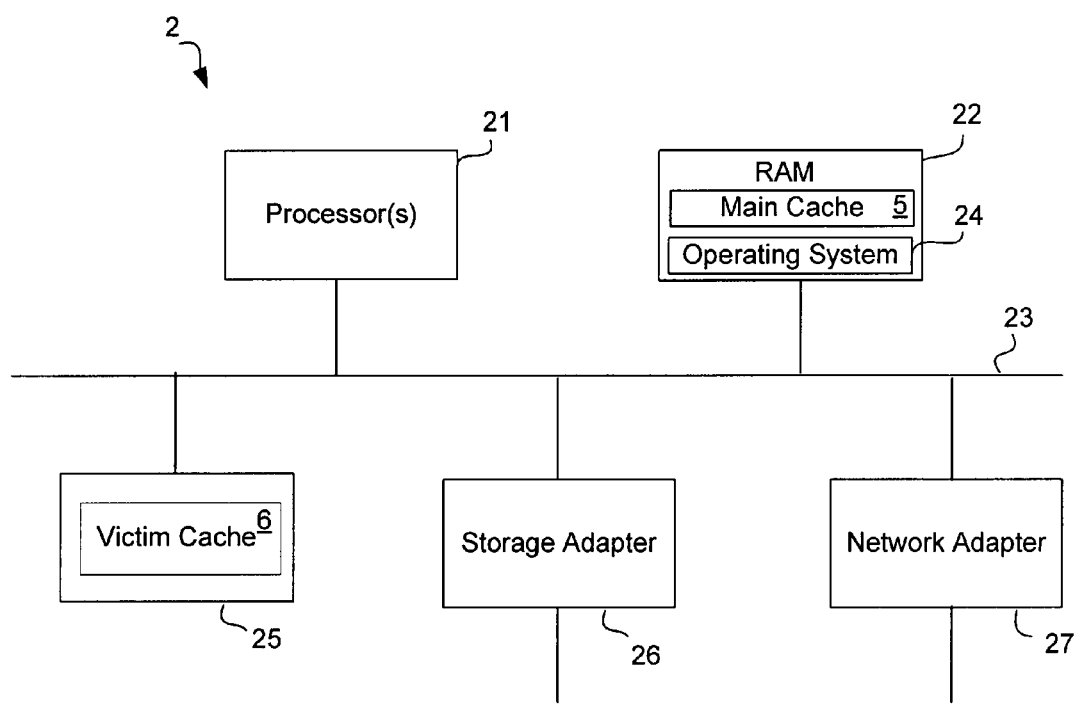
FIG. 2 shows an example of the hardware architecture of the storage server, including a victim cache.

FIG. 2 is a block diagram showing an example of the architecture of the storage server 2 at a high level. Certain standard and well-known components which are not germane to the present invention are not shown. The storage server 2 includes one or more processors 21 and RAM 22 coupled to a bus system 23. The storage server 2 may also include one or more forms of read-only memory (ROM), not shown. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 21 form the CPU of the storage server 2 and, thus, control its overall operation. In certain embodiments, the processors 21 accomplish this by executing software stored in RAM 22 and/or other memory in the storage server 2. Each processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

RAM 22 is the main memory (which includes the main cache 5) of the storage server 2 and also may store some or all of the storage server's operating system 24 during normal operation. Operations associated with the technique being introduced here can be implemented by the operating system 24.

Also connected to the processors 21 through the bus system 23 are a peripheral device 25 which implements the victim cache 6, a storage adapter 26 and a network adapter 27. Peripheral device 25 can be implemented as a dedicated expansion card, and the memory which embodies the victim cache 6 may be implemented in the form of SSDs or other types of storage devices. Note, however, that it is not essential that the victim cache 6 be internal to the storage server 2.

The storage adapter 26 allows the storage server 2 to access the mass storage subsystem 4 and may be, for example, a Fibre Channel adapter or a SCSI adapter. The network adapter 27 provides the storage server 2 with the ability to communicate with remote devices, such as the clients 1, over a network and may be, for example, an Ethernet adapter, a Fibre Channel adapter, or the like.

Figure 3:
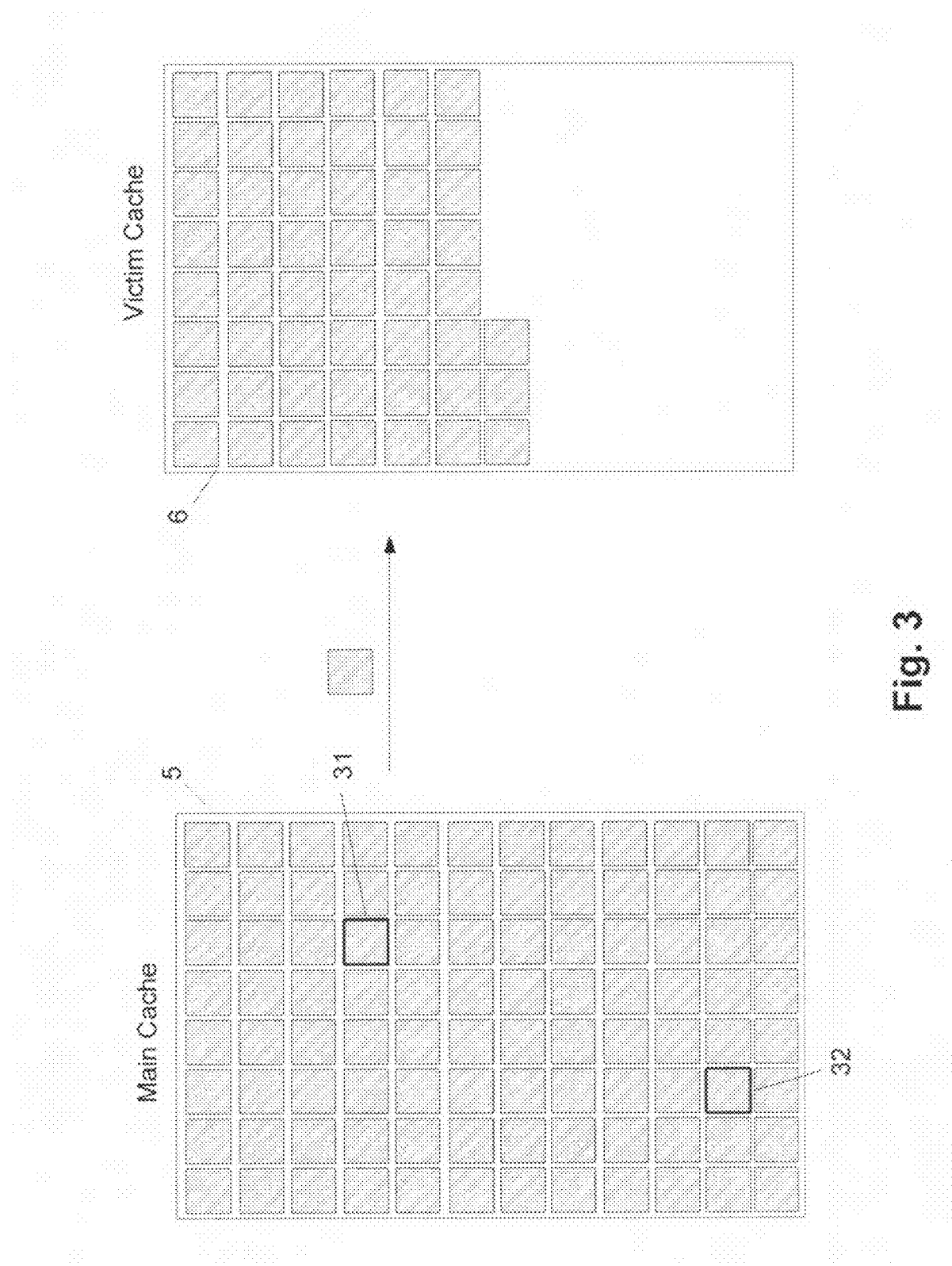
FIG. 3 illustrates eviction of a data block from the main cache to the victim cache.

The process of identifying an old data block in the main cache and then evicting it is known as block "scavenging". An example of the block eviction process is illustrated in FIG. 3. Note that FIG. 3 is not intended to illustrate the true relative sizes of the main cache 5 and the victim cache 6. In practice, the relative sizes of the main cache 5 and victim cache 6 may vary with the implementation, as may their relative speeds, etc.

When there is a need to write a block into the main cache 5 but the main cache 5 is full, a block 31 in the main cache 5 is identified for eviction (alternatively, this scavenging process may be performed as a background process, not in connection with any particular write operation). The identified block 31 then may be stored in the victim cache 6, depending upon the outcome of one or more caching policies. This process is normally expected to return another block 32 for the storage server 2 to immediately overwite (reuse) in the main cache 5, which may or may not be the same block 31 that was evicted from the main cache 5.

Note that any conventional algorithm or set of algorithms can be used to decide which blocks should be evicted from the main cache 5 (e.g., least recently used (LRU), first-in/first-out (FIFO), etc.). In one embodiment, the main cache 5 is managed as a waterfall set of multiple LRU queues, each having different priorities, where each block slowly ages down the set of queues while the block is not accessed, and moves up the set of queues based on accesses to that block (aging is based on the operation rate).

Figure 4:
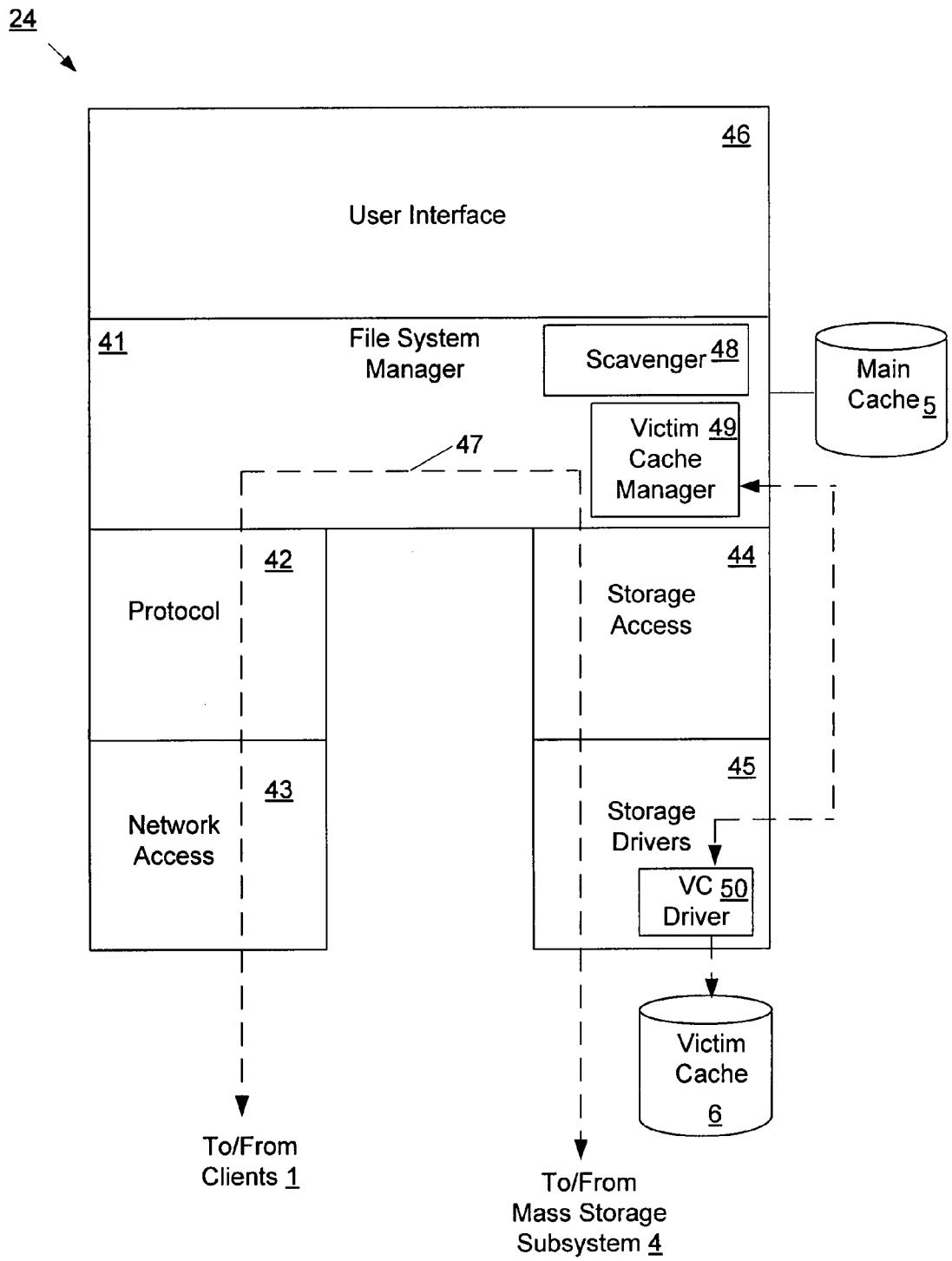
FIG. 4 illustrates an example of the architecture of the operating system of the storage server.

The storage server 2 includes an operating system 24 to control its operation, including implementation of the technique illustrated in FIG. 3. An example of the operating system is shown in FIG. 4. The operating system 24 and its constituent elements are preferably implemented in the form of software and/or firmware. However, in some embodiments, some or all of the elements of the operating system 24 may be implemented in the form of special-purpose hardware, such as one or more application specific integrated circuits (ASICs), programmable logic devices (PLDs) or the like, or a combination of such hardware and software/firmware. Further, the operating system 24 can be implemented in a storage server that has either a distributed or non-distributed physical architecture, such as mentioned above.

As shown, the operating system 24 includes several modules, or "layers". These layers include a file system manager 41. The file system manager 41 is, in certain embodiments, software that manages one or more file systems or other structured sets of data managed by the storage server 2. In particular, the file system 41 imposes a hierarchy (e.g., a directory/file structure) on the data stored in the storage subsystem 4 and manages client-initiated read and write operations at a high level (while delegating certain functions to lower-level layers). The file system manager 41 also manages access to the main cache 5, the victim cache 6 and (at a high level) the mass storage subsystem 4 (access to the mass storage subsystem 4 is managed at a lower-level by the storage access layer 44, as discussed below).

To allow the storage server 2 to communicate over the network 3 (e.g., with clients 1), the operating system 24 also includes a network access layer 43, and a protocol layer 42 operatively coupled between the file system manager 41 and the network access layer 43. The protocol layer 42 implements a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 43 includes one or more drivers which implement one or more lower-level protocols to communicate over the network, such as Ethernet or Fibre Channel.

To enable the storage server 2 to communicate with the mass storage subsystem 4, the operating system 24 includes a storage driver layer 45, and a storage access layer 44 operatively coupled between the file system manager 41 and the storage driver layer 45. The storage access layer 44 implements a higher-level disk storage protocol, such as RAID-4, RAID-5 or RAID-DP. The storage access layer 4 is alternatively called the "RAID layer" in this description. The storage driver layer 45 implements a lower-level storage device access protocol, such as Fibre Channel Protocol (FCP) or SCSI. In addition, the storage driver layer 45 includes the victim cache driver 50, which provides the file system manager 46 with access to the victim cache 6.

Also shown in FIG. 4 is the path 47 of data flow, through the operating system 24, associated with a client-initiated read or write request.

The operating system 24 also includes a user interface 46 to generate a command line interface (CLI) and/or graphical user interface (GUI), to allow administrative control and configuration of the storage server 2, from a local or remote terminal.

As shown in FIG. 4, the file system manager 41 includes a scavenger module 48 and a victim cache manager 49. The scavenger module 48 implements the block scavenging process, as described above. The victim cache manager 49 controls at a high level the storage of data in the victim cache 6 by using standard file system I/O operations (reads and writes), via the victim cache driver 50, as further described below. To facilitate these operations, the victim cache manager 49 maintains in main memory 22 a cache tag table (not shown) that indicates whether any given block is in the victim cache 6 and other information relating to victim-cached blocks as described above.

As mentioned above, the technique introduced here efficiently offloads a portion of the victim cache tag store into the victim cache itself, to reduce the amount of main memory 22 consumed by the victim cache tag store. In certain embodiments, this is accomplished by appending cache tag information to DMA transfers between the host and the victim cache 6. This technique is described further now with reference to FIGS. 5 through 11.

Figure 5:
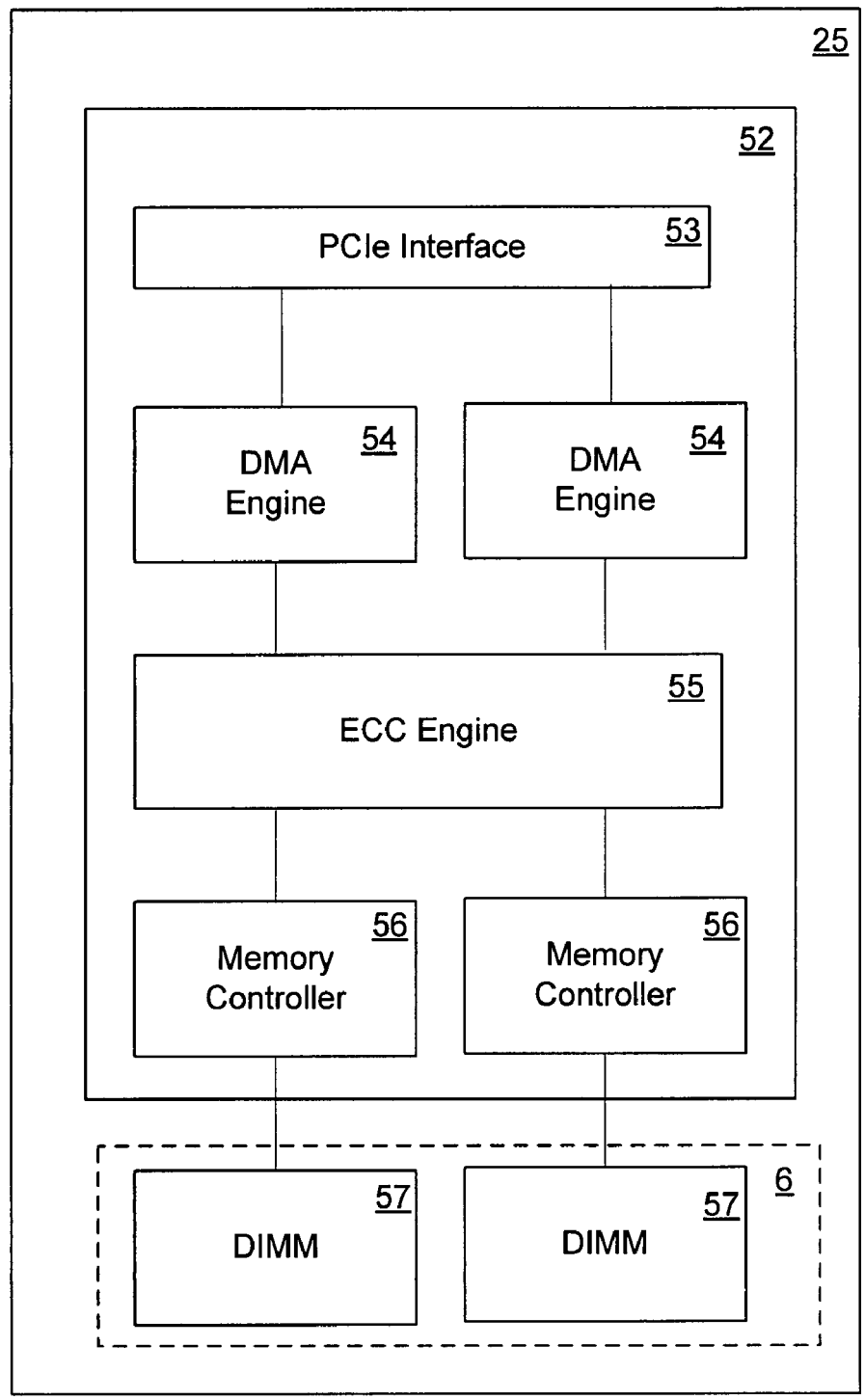
FIG. 5 is a block diagram illustrating an example of the peripheral device which includes the victim cache.

FIG. 5 illustrates in greater detail an example of the peripheral device 25 (which includes the victim cache 6), according to certain embodiments. In certain embodiments, the peripheral device 25 is embodied as a PCI Express (PCIe) compatible device 51 (e.g., on a conventional expansion card). As illustrated, the peripheral device 25 includes a number of dual in-line memory modules (DIMMs) 57, which implement the actual victim cache storage. The remainder of the functionality of the peripheral device 25 is embodied in a control unit 52, which in certain embodiments is a field programmable gate array (FPGA). In other embodiments, the control unit 52 could be embodied as, for example, one or more programmable microprocessors, microcontrollers, ASICs, PLDs, or the like, or any combination of such devices.

Control unit 52 includes a conventional PCIe interface 53, a number of conventional DMA engines (DMA channels) 54 connected to the PCIe interface 53, an error correction code (ECC) engine 55 connected to the DMA engines 54, and a number of memory controllers 56 connected to the ECC engine 55. Note that while FIG. 5 shows two each of the DMA engines 54, memory controllers 56, and DIMMs 57, essentially any number of these components could be used.

The PCIe interface 53 provides connectivity to the host, i.e., it connects to a PCIe bus (which is represented at least in part in bus system 23 in FIG. 2) in the storage server 2.

In certain embodiments, the DIMMs 57 (which implement the victim cache storage) are conventional DDR-2 dynamic RAM (DRAM) DIMMs. The memory controllers 56 can be any conventional type of memory controllers suitable for controlling access to the type of memory employed.

The purpose of the ECC engine 55 is to compute and compare checksums to ensure integrity of data transferred across the PCIe link with the host. On the host side, the checksums for both the data and the DMA descriptor are computed by the operating system 24. For DMA writes to the victim cache 6, the victim cache driver 50 (FIG. 4) generates the checksums in main memory 22, and they are then verified by the ECC engine 55 when the data is transferred. For DMA reads from the victim cache 6, the ECC engine 55 generates the checksum on-the-fly, and they are recomputed and verified by the victim cache driver 50. The checksums may be, for example, cyclic redundancy check (CRC) checksums. Note, however, that the particular nature of the checksums and the algorithm(s) used to generate and verify them are not germane to the technique being introduced here.

Each of the DMA engines 54 is configured to perform the functionality described herein but is otherwise conventional in nature. The DMA engines 54 support moving data to and from the local (victim cache) memory and moving that data from and to the host memory (main memory 22 of the storage server 2). Each DMA engine 54 operates independently of the other and can move data in either direction.

In addition, according to the technique introduced here, the DMA engines 54 support "appendix" DMA transfers, which allow a certain number of bytes of data, such as cache tag information, to be encoded in a DMA descriptor and appended to a DMA write to the victim cache 6. The behavior is symmetric for reads and writes; i.e., for reads the appendix data is read along with the actual block data from the victim cache 6 and written into the completed DMA descriptor. These appendix DMA transfers allow extra information that is not contiguous with the data block in physical memory (such as cache tag information) to be transferred in a single DMA transfer rather than multiple transfers. This enables the file system manager 41 to offload at least some of the cache tag information to the victim cache 6 without increasing the required number of file system I/Os or DMA transfers. In addition, this functionality is advantageous to any other driver client that would like to associate a small amount of separate metadata with each data block being transferred without incurring the penalty of multiple transfers for each block.

For each block stored in the victim cache 6, the block's cache tag includes the block ID of the block, the address of the block in the victim cache, a file ID of the file that contains the block, a file offset indicating the offset of the block within the file, and various flags. The file ID and file offset are generated by the file system manager 41. These two items of information are sometimes called "RAID context information", since they provide the RAID layer (i.e., storage access layer 44) with the context information it needs to perform RAID reads and writes on the mass storage subsystem 4. The RAID context information can also be used by the operating system 24 to identify victim-cached blocks that have been moved after they were cached, such as by a segment cleaning or defragmentation process, as described further below.

It has been found that in at least some implementations, the file ID and file offset represent a substantial portion of the total memory space consumed by the victim cache tag store, whereas the remaining items of tag information collectively represent only a small portion of the overall tag store. Consequently, in certain embodiments the file ID and file offset of all victim-cached blocks are appended to DMA transfers to the victim cache 6 so as to offload that information to the victim cache 6, rather than storing that information in main memory 22. The remainder of the cache tag information is maintained in main memory 22. Note that in other embodiments, different items of cache tag information could instead be offloaded to the victim cache 6 and/or maintained in main memory 22, to achieve the desired system performance. And as indicated above, in other embodiments, types of information other than cache tag information could be appended to DMA transfers and stored in the victim cache 6 in the manner described herein.

Figure 6:
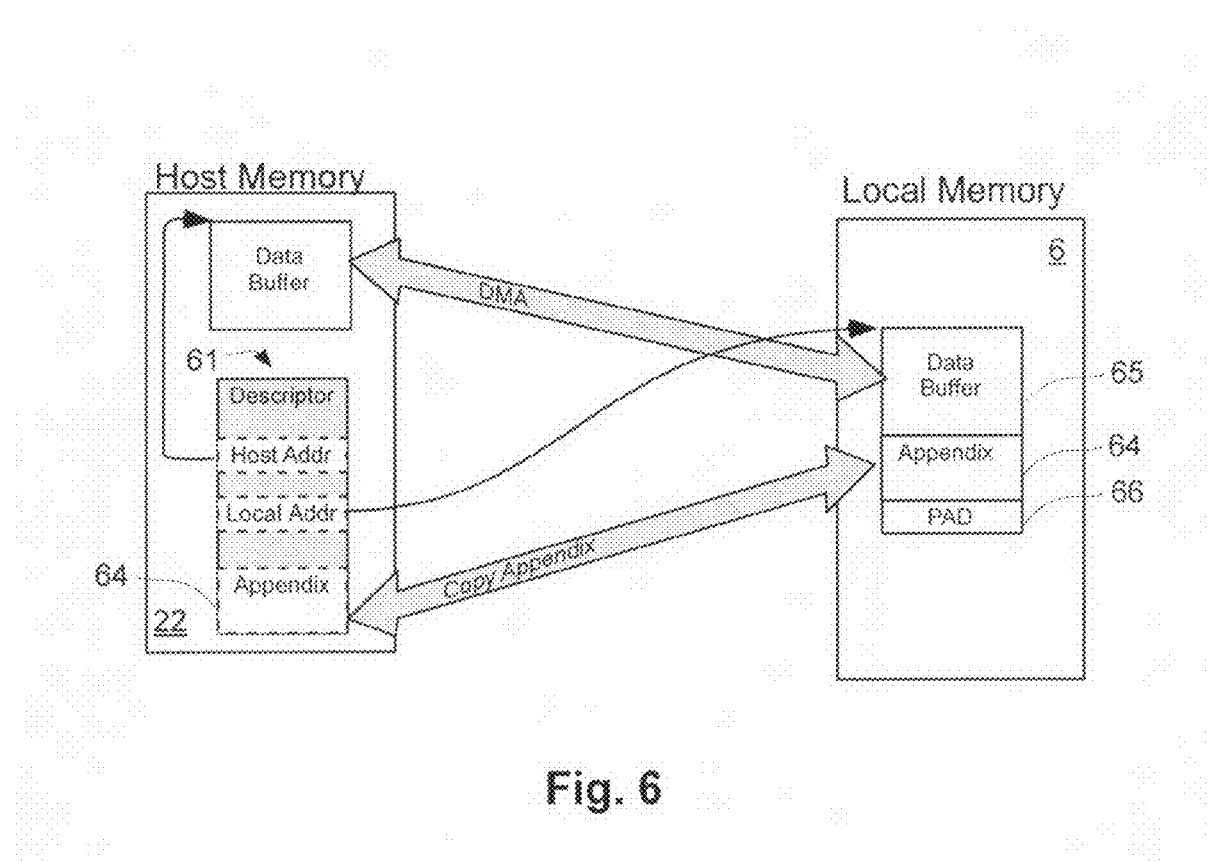
FIG. 6 illustrates the appending of information such as a cache tag to a data block.

FIG. 6 illustrates the appending of information (e.g., cache tag information) to a data block being transferred to or from the victim cache 6. To control the DMA engines 54, the victim cache driver 50 generates DMA descriptors in host memory (main memory 22). A DMA descriptor is generated for each DMA transfer to be performed (read or write) between the host and the victim cache. As shown in FIG. 6, a DMA descriptor 61 includes, among other information, the host address of the data block to be transferred and the local address of the data block in the victim cache 6 (also called "local memory"). The descriptor also includes an appendix 64, which can optionally be appended to a DMA transfer. In certain embodiments, the appendix 64 includes a portion of the cache tag for the data block, e.g., the file ID and file offset of the data block. In certain embodiments, during a write to the victim cache 6, the appendix 64 is transferred from the descriptor to the victim cache 6 at the next 64-byte aligned address after the end of the DMA transfer. In such an embodiment, the DMA alignment and size atom is 64 bytes, so the appendix 64 immediately follows the data 65. The appendix 64 is padded by the DMA engine with a pad 66 of logic zeroes to make the length of the appendix 64 bytes. On reads from the victim cache 6, the appendix 64 is read from the end of the victim-cached block 65 and placed into the descriptor 61 in main memory 22. The pad 66 is dropped by the DMA engine 54 and not returned.

Figure 7A:
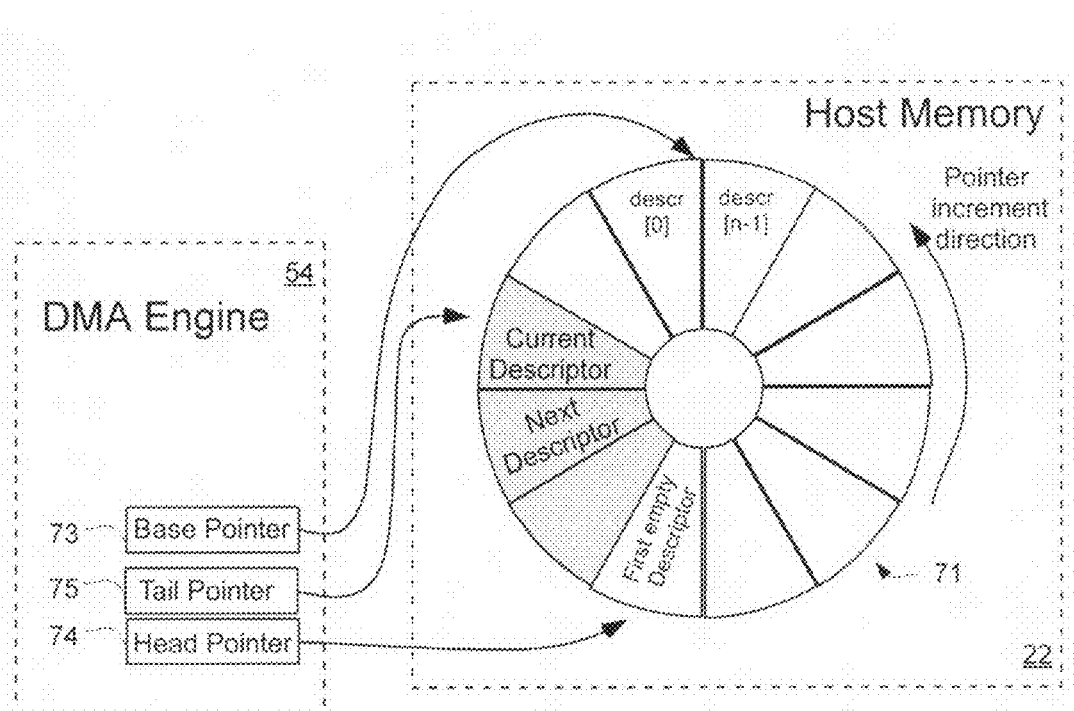
FIGS. 7A and 7B are two alternative representations of a direct memory access (DMA) descriptor ring.
Figure 7B:
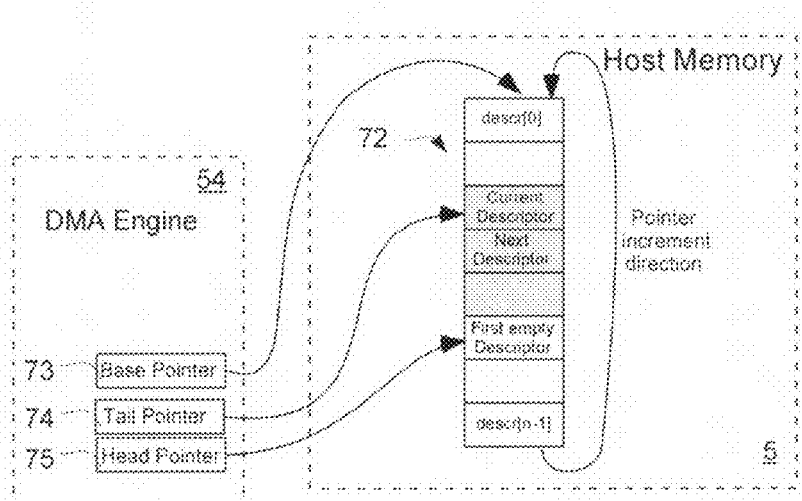

FIGS. 7A and 7B show an example of the DMA descriptor in greater detail, according to two alternative representations. The DMA engines 54 read each descriptor from a ring buffer 71 and perform the transfers described by the descriptor. When a DMA engine 54 has completed processing of a descriptor, it proceeds with the next descriptor if there is another one ready. The descriptors are kept in host memory (main memory 22) and read by the DMA engine 54 as they are processed. The data structure for the descriptors is a ring, and each DMA engine 54 has its own ring. Since the structure is a ring and host memory is generally not configured as a ring, the ring can actually be implemented in host memory as an array 72 which wraps back to the beginning after the last descriptor, as shown in FIG. 7B. For a ring containing n descriptors, the descriptor which follows descriptor [n−1] is descriptor [0].

To manage the DMA descriptors, each DMA engine 54 has several registers which contain pointers. These registers include a Base pointer register 73, a Head pointer register 74 and a Tail pointer register 75. The Base pointer is a pointer into the host memory where the ring for the specific DMA channel is located. The upper bits of the Base pointer are concatenated by the DMA engine 54 with the Head and Tail pointers to determine the host memory address that the DMA engine 54 needs to access for the descriptors.

The Head pointer points to the next empty descriptor. When host software (e.g., victim cache driver 50) wants to add a descriptor, this pointer points to the location where the software should place the descriptor. After writing the descriptor to the location, the host software needs to advance the pointer so that the DMA engine 54 will know that a DMA operation has been requested. This can be done by adding 64 to the Head pointer. The DMA engine 54 does not alter the Head pointer except when it is reset. As a result, the host software can maintain a copy of it in main memory to avoid having to read the pointer from the register 74 in order to advance it.

The Tail pointer points to the current descriptor being processed. When the DMA engine 54 completes processing of a descriptor, it advances the Tail pointer. When the Tail pointer equals the Head pointer, the buffer is empty. As a result, there must always be at least one empty descriptor in the ring in this embodiment (if the ring were allowed to become full, the Head and Tail pointers would be equal but the DMA engine 54 would incorrectly interpret this condition to mean that the ring is empty).

Note that in other embodiments, the DMA descriptors could be stored in a data structure other than a ring buffer. For example, the DMA engines 54 could instead work from a linked list of descriptors, where each descriptor in the list points to the next descriptor.

FIG. 8 illustrates an example of the format of a DMA descriptor used according to the technique introduced here. As shown, in the illustrated embodiment a DMA descriptor 81 includes an 8-byte host address field, followed respectively by an 8-byte local address field (the address in the victim cache 6), a 4-byte descriptor CRC (Descr_CRC), a one-byte Status field, a one-byte Control field, two-byte Length field, an 8-byte Return CRC (Return_CRC), and a 4-byte Driver Storage field.

Following the Driver Storage field, the descriptor 81 includes 32 bytes for optional appendix information. As discussed above, these bytes may be used to transfer cache tag information.

Note that the number of bytes occupied by each of these fields as stated above is only an example; in other embodiments, the appendix information and any of the other fields of a DMA descriptor may occupy a different number of bytes than what is stated here. Furthermore, in some embodiments a DMA descriptor may not include all of the above-mentioned fields and/or it may include other fields not mentioned above.

The Length field indicates the Length of the data to be transferred in 64 byte atoms. As the DMA channel makes progress, this field reflects the remaining data to be transferred. As a result it will decrease to 0. Because this field changes with DMA progress, upon successful completion of the DMA descriptor, this field is not returned to the descriptor. The original value in the descriptor is left unchanged.

The purpose of the Control field is to provide the victim cache driver 50 with a mechanism to control the DMA engines 54 on a per-descriptor basis. The Control field includes flags which the DMA engine 54 uses to determine the direction in which to move the data (to or from the host), whether or not to perform the Appendix DMA, whether or not to interrupt upon completion of the descriptor, and whether or not to return the "Return CRC". As the DMA progresses, this field is not changed. Upon completion when the DMA channel writes the Status back to the descriptor, the Control field in the descriptor is left unchanged.

The Status field is read with the DMA descriptor. Upon successful completion of the DMA transfer the Status is written back to the descriptor. While the DMA is in progress the value of Status is meaningless and could be any value.

The Descriptor CRC is the value of the descriptor's CRC (checksum) read from the descriptor. Upon completion when the DMA channel writes the Status back to the descriptor, the Descriptor CRC in the descriptor is left unchanged.

The Driver Storage field is a tag value that has no effect on the operation of the DMA channel. It is for software use (e.g., by the operating system 24). Upon completion when the DMA channel writes the Status and Return CRC back to the descriptor, and this field in the descriptor is left unchanged.

The Return CRC is the CRC value that will be returned when the DMA operation completes (assuming a predetermined "check" bit in the Control field is set). As the DMA progresses, the Return CRC field contains the intermediate CRC values.

Figure 9:
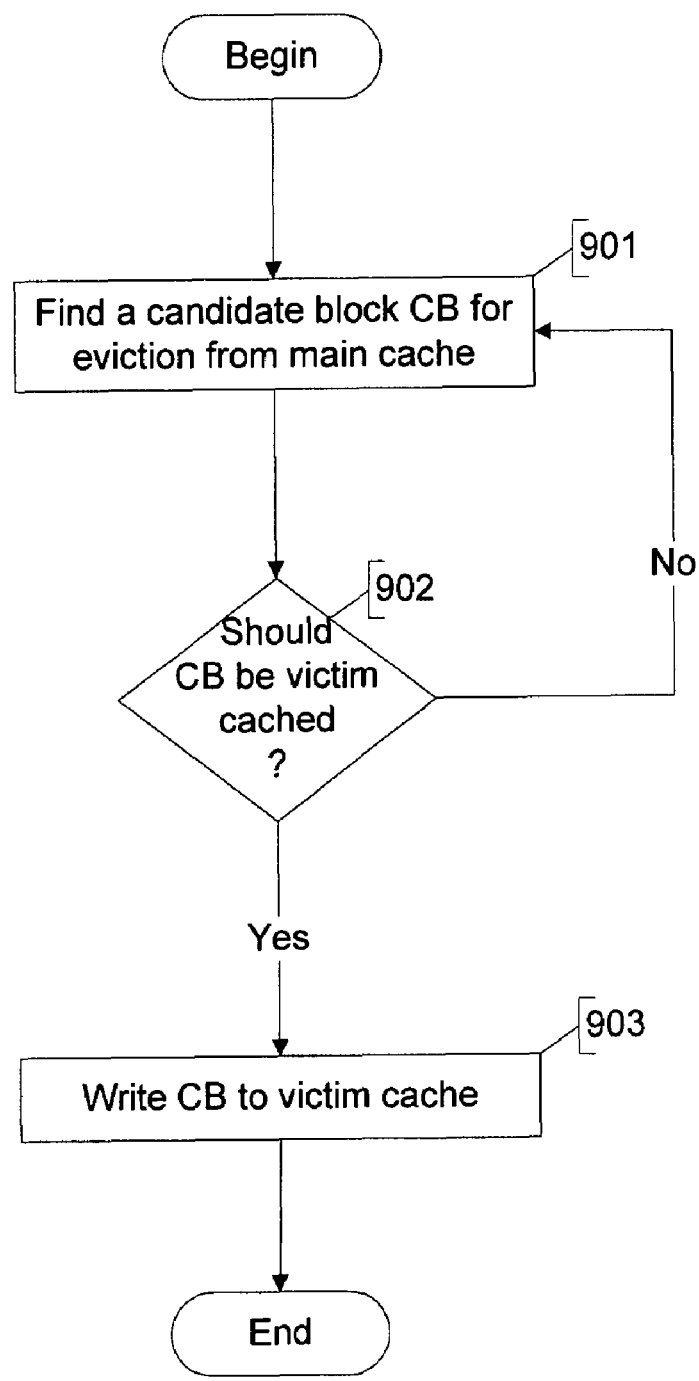
FIG. 9 is a flow diagram illustrating an example of the data block scavenging process.

FIG. 9 illustrates an example of the block scavenging process, according to which a data block may be written to the victim cache. As indicated above, the process may be triggered when there is a specific need (e.g., when a block needs to be written to the main cache but the main cache is full) or it may be performed as a background process. Initially, at 501 the scavenger module 48 (FIG. 4) in the operating system 24 finds a candidate block CB for eviction from the main cache 5. Next, at 502 the victim cache manager 49 determines whether the candidate block CB should be cached in the victim cache 6 (using, for example, one or more caching policies). If the outcome of this determination is negative, the process loops back to 501 where another candidate block for eviction is found. If the outcome of determination 502 is affirmative, then the victim cache manager 49 stores the candidate block CB in the victim cache 6.

Figure 10:
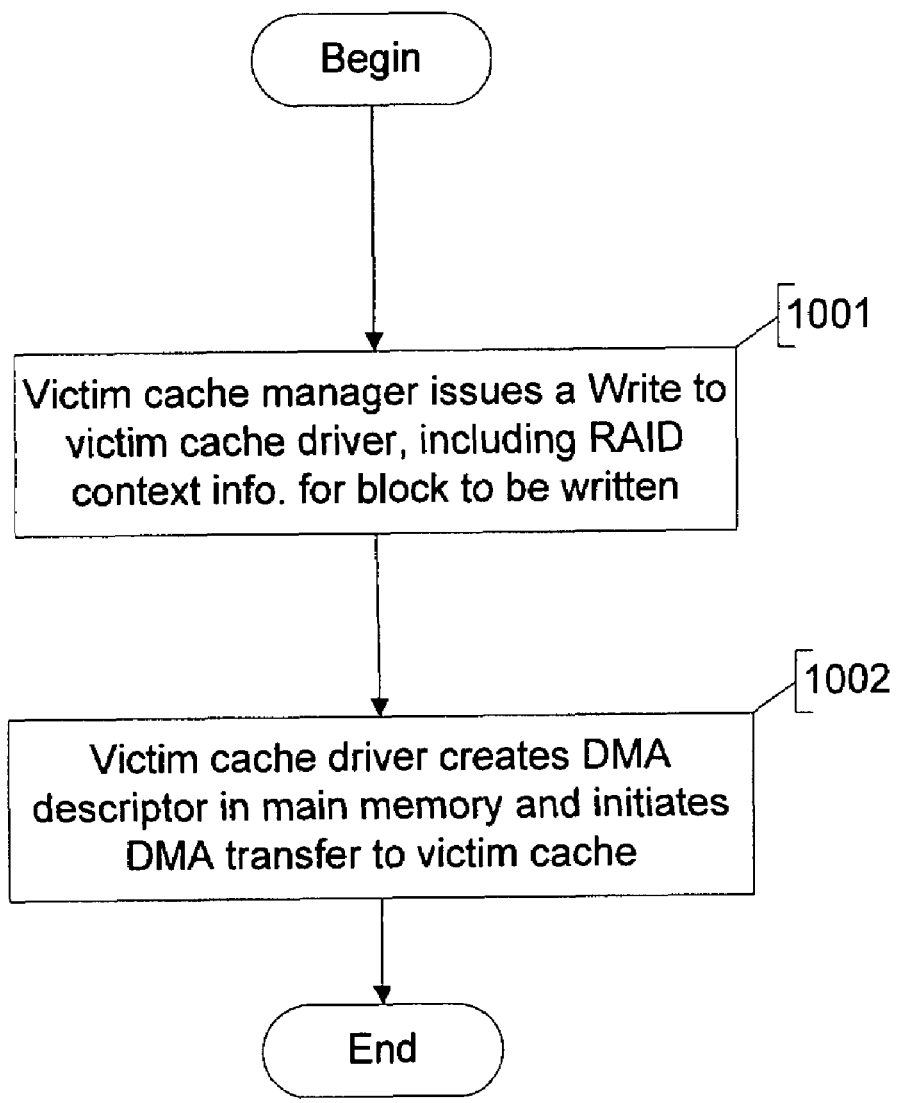
FIG. 10 is a flow diagram illustrating an example of the process of writing a data block to the victim cache.

FIG. 10 is a flow diagram illustrating in detail an example of the process of writing the candidate data block CB to the victim cache 6 (operation 903). It will be recognized that multiple blocks can be written to the victim cache 6 in essentially the same way. At 1001 the victim cache manager 49 (FIG. 4) issues a write request to the victim cache driver 50. The write request includes RAID context information for the candidate block CB (e.g., file ID and file offset). At 1002 the victim cache driver 50 responds to the write request by creating a DMA descriptor in main memory and then initiating a DMA transfer to the victim cache 6, e.g., by sending an appropriate command to the DMA engine 54.

Figure 11:
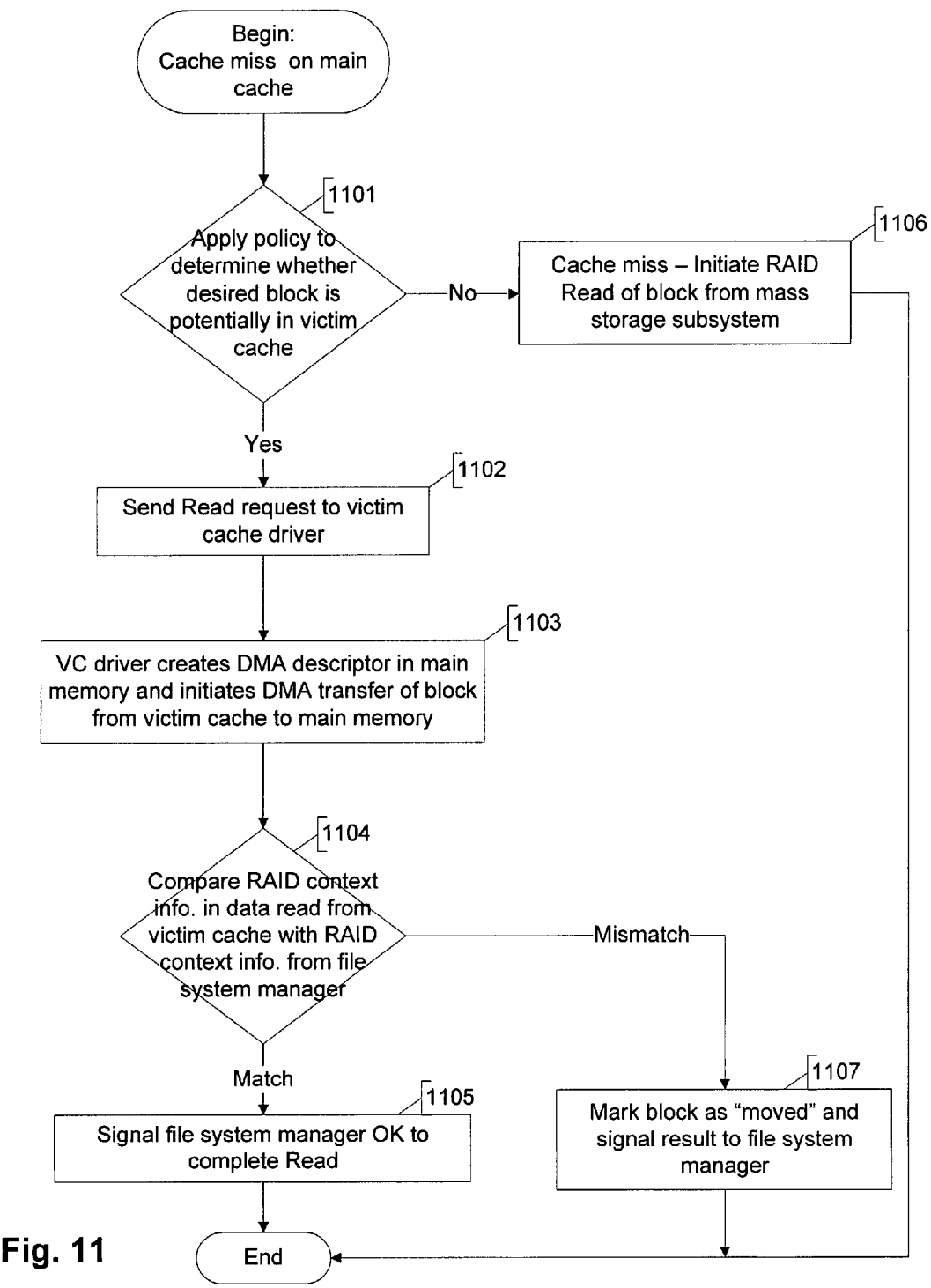
FIG. 11 is a flow diagram illustrating an example of the process of reading a data block from the victim cache.

FIG. 11 is a flow diagram illustrating an example of the process of reading a data block from the victim cache 6 (such as in response to a cache miss on the main cache 5). It will be recognized that multiple blocks can be read from the victim cache 6 in essentially the same way. Initially, at 1101 the process applies a caching policy to determine whether the desired block is potentially in the victim cache 6. If the desired block is not potentially in the victim cache 6, then this situation is a cache miss on the victim cache 6, in which case the process proceeds to 1106. At 1106 the file system manager 41 (FIG. 4) initiates a RAID read of the block from the mass storage subsystem 4 (FIG. 1), via the RAID layer 44 of the operating system 24. The process then ends.

If, however, the desired block is potentially in the victim cache 6, then the process proceeds to 1102, in which the file system manager 41 sends to the victim cache manager 49 a read request, which includes the RAID context information (e.g., file ID and file offset) of the desired block, and the victim cache manager 50 then sends the read request (without the RAID context information) to the victim cache driver 50. Note that this read request to the victim cache driver 50 bypasses the RAID layer 44 of the operating system 24. At 1103 the victim cache driver 50 creates a DMA descriptor for the requested transfer in main memory 22 and initiates a DMA transfer of the desired block from the victim cache 6 to main memory 22. The block read from the victim cache 6 has its RAID context information appended to it, as described above in relation to FIG. 6.

At 1104 the victim cache manager 49 compares the RAID context information that is appended to the block read from the victim cache 6 with the corresponding RAID context information received from the file system manager 41 in the read request. If all of the items of information match, the victim cache manager 49 signals the file system manager 41 that the read can be completed, and the file system manager 41 completes the read in a conventional manner. A mismatch in any of the compared items of information indicates that the corresponding block has been relocated, such as the result of a segment cleaning or defragmentation process. In that case, at 1107 the victim cache manager 49 marks the block as "moved" and signals this result to the file system manager 41. In that case, the file system manager 41 may invoke another process to locate the moved block, the details of which are not germane to the technique introduced here, or it may simply return an error message to the calling process.

Thus, a method and apparatus for partially offloading storage of cache tags for a storage server victim cache have been described.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    in a network storage server which has a non-volatile mass storage facility, a main cache and a victim cache, generating cache tag information for each of a plurality of data blocks to be stored in the victim cache;
    storing in the main cache a first subset of the cache tag information for each of the data blocks, and storing in the victim cache a second subset of the cache tag information for each of the data blocks; and
    reading or writing a data block and corresponding cache tag information for the data block from or to the victim cache, respectively, by appending the corresponding cache tag information to the data block, wherein the data block and corresponding cache tag information read from the victim cache is written to the main cache, and the data block and corresponding cache tag information written to the victim cache is read from the main cache.

2. A method as recited in claim 1, wherein said storing in the victim cache the second subset of the cache tag information is done to avoid storing the second subset of the cache tag information in the main cache.

3. A method as recited in claim 1, further comprising:
    reading or writing a data block and corresponding cache tag information for the data block from or to the victim cache, respectively, by using only a single file system input/output operation.

4. A method as recited in claim 3, wherein said reading or writing comprises appending the corresponding cache tag information to the data block.

5. A method as recited in claim 4, wherein said appending the corresponding cache tag information to the data block is performed as part of a direct memory access (DMA) transfer.

6. A method as recited in claim 1, wherein for each data block the first and second subset of cache tag information comprises information for use in locating the data block.

7. A method as recited in claim 1, wherein for each data block the second subset of cache tag information comprises RAID context information.

8. A method as recited in claim 1, wherein for each data block the second subset of cache tag information comprises a file identifier and a file offset for the data block.

9. A method of operating a network storage server, the method comprising:
    storing data in a non-volatile mass storage facility, a main cache and a victim cache of the network storage server, wherein the data stored in the victim cache includes a plurality of data blocks;
    for each of the data blocks stored in the victim cache, storing in the main cache a first set of cache tag information corresponding to the data block;
    for each of the data blocks stored in the victim cache, storing in the victim cache a second set of cache tag information corresponding to the data block, the second set of cache tag information including a file identifier and a file offset for each data block;
    writing a first data block and corresponding cache tag information for the first data block to the victim cache by using only a single file system write operation, including appending the cache tag information for the first data block to the first data block in a direct memory access (DMA) to the victim cache; and
    reading the first data block and the corresponding cache tag information for the first data block from the victim cache into the main cache by using only a single file system read operation, including appending the cache tag information for the first data block to the first data block in a DMA from the victim cache.

10. A network storage server comprising:
    a processor;
    a network interface through which to receive data access requests from a plurality of clients via a network;

a storage interface through which to access a non-volatile mass storage facility;
a main cache;
a victim cache;
a storage operating system to generate cache tag information for a data block, and to initiate an access to the victim cache in relation to the data block by using a single file system input/output (I/O) operation; and
a victim cache control module including a direct memory access (DMA) engine to execute a DMA transfer of the data block between the main cache and the victim cache in response to the single file system I/O operation, by appending the cache tag information to the data block, wherein a first set of cache tag information corresponding to the data block is stored in the main cache and a second set of cache tag information corresponding to the data block is stored in the victim cache.

11. A network storage server as recited in claim 10, wherein the first and second subset of cache tag information comprises information for use in locating the data block.

12. A network storage server as recited in claim 10, wherein the second set of cache tag information comprises RAID context information for the data block.

13. A network storage server as recited in claim 10, wherein the second set of cache tag information comprises a file identifier and a file offset for the data block.

14. A network storage server as recited in claim 10, wherein the victim cache control module further comprises a register to store at least a portion of the cache tag information prior to appending the cache tag information to the data block.

15. A network storage server comprising:
a network interface through which to receive data access requests from a plurality of clients via a network;
a storage interface through which to access a non-volatile mass storage facility;
a main cache;
a victim cache;
means for transferring a data block between the main cache and the victim cache in response to a single file system input/output (I/O) operation by appending cache tag information to the data block; and
means for storing a first subset of cache tag information for the data block in the main cache and means for storing a second subset of the cache tag information for the data block in the victim cache.

16. A network storage server as recited in claim 15, wherein the second subset of cache tag information comprises a file identifier and a file offset for the data block.

17. A network storage server as recited in claim 15, wherein the means for transferring a data block between the main cache and the victim cache comprises means for writing a data block to the victim cache in response to the single file system input/output (I/O) operation by appending cache tag information to the data block.

18. A network storage server as recited in claim 15, wherein the means for transferring a data block between the main cache and the victim cache comprises means for reading a data block from the victim cache in response to the single file system input/output (I/O) operation by appending cache tag information to the data block.

19. A network storage server as recited in claim 15, wherein the first and second subset of cache tag information comprise information for use in locating the data block.

20. A network storage server as recited in claim 15, wherein the second subset of cache tag information comprises RAID context information.

21. A network storage server as recited in claim 15, wherein the second subset of cache tag information comprises a file identifier and a file offset for the data block.

22. A network storage server as recited in claim 15, wherein said means for transferring comprises means for executing a direct memory access (DMA) transfer of said data block between the main cache and the victim cache.

* * * * *